United States Patent [19]

Korbel et al.

[11] Patent Number: 4,503,161

[45] Date of Patent: Mar. 5, 1985

[54] LATENT LEWIS ACID CATALYST ENCAPSULATED WITHIN POLYMERIZED CYCLOALIPHATIC EPOXIDE AND POLYHYDRIC ALCOHOL

[75] Inventors: Gerald E. Korbel, Little Canada; Richard G. Newell, Woodbury, both of Minn.

[73] Assignee: Minnesota Mining and Manufacturing Company, Saint Paul, Minn.

[21] Appl. No.: 592,578

[22] Filed: Mar. 23, 1984

[51] Int. Cl.$^3$ .................... C08G 59/72; C08G 59/68; C08G 65/28; B01J 31/06

[52] U.S. Cl. ........................ 502/159; 523/205; 523/211; 525/107; 525/524; 526/209; 526/210; 526/233; 526/237; 528/89; 528/91; 528/93; 528/361

[58] Field of Search ............... 502/159; 528/89, 91, 528/92, 361; 523/205, 211; 252/107, 524; 526/195, 209, 210, 233, 237

[56] References Cited

U.S. PATENT DOCUMENTS

| | | | |
|---|---|---|---|
| 3,018,258 | 1/1962 | Meier et al. | 523/211 |
| 3,384,680 | 5/1968 | Lussow | 502/159 |
| 4,020,017 | 4/1977 | Smith et al. | 528/361 |
| 4,225,460 | 9/1980 | Newell | 502/159 |
| 4,237,252 | 12/1980 | Newell et al. | 525/454 |
| 4,294,746 | 10/1981 | Blair et al. | 528/361 |

*Primary Examiner*—P. E. Konopka
*Attorney, Agent, or Firm*—Donald M. Sell; James A. Smith; David L. Weinstein

[57] ABSTRACT

Microcapsules with liquid fills containing Lewis acid catalysts, catalyst concentrates comprising slurries of the microcapsules in liquid media, and a method for preparing the microcapsules and concentrates. The catalyst concentrates of the present invention are storage stable both alone and when incorporated in a one-part epoxy formulation.

21 Claims, No Drawings

LATENT LEWIS ACID CATALYST ENCAPSULATED WITHIN POLYMERIZED CYCLOALIPHATIC EPOXIDE AND POLYHYDRIC ALCOHOL

BACKGROUND OF THE INVENTION

1. Field of the Invention

The present invention relates to a latent Lewis acid catalyst suitable for use in a storage-stable, one-part, curable resin system.

2. Description of the Prior Art

Storage-stable, one-part, curable resin systems generally comprise two or more reactive or reaction-producing components stored in an intimately admixed, unreactive state which, ideally, react rapidly when subjected to a suitable stimulus, such as application of heat or mechanical shear.

Newell, U.S. Pat. No. 4,225,460, discloses latent Lewis acid catalysts for cationically polymerizable resin systems comprising microcapsules of a Lewis acid-polyhydric alcohol (preferably glycerol) complex encapsulated within shell walls of a crosslinked interfacial polycondensation product of an aromatic polyisocyanate, glycerol and a cycloaliphatic epoxide, a process for the preparation of the microcapsules, and latent Lewis acid concentrates comprised of the microcapsules dispersed in a liquid medium.

The concentrates of the Newell patent were defined as slurries of

A. rupturable, impermeable microcapsules ranging in size from about 0.1 to 400 micrometers having (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and (2) liquid fills comprising a Lewis acid-glycerol complex; and B. A liquid medium selected from aromatic polyisocyanates as defined above and esters of an aromatic carboxylic acid and an alkyl, aralkyl or aryl alcohol, the ester containing up to about 40 carbon atoms.

The latent, one-part epoxy formulations made utilizing the catalysts of Newell, U.S. Pat. No. 4,225,460 have excellent shelf stability at room temperature. However, the capsule concentrates alone do not exhibit an adequate level of storage stability. Because of the reactivity of the isocyanates present in these capsule concentrates, the viscosities of the concentrates increase fairly rapidly at room temperature until they become unusable, usually within a period of one or two months. Refrigeration of the concentrates improves shelf-life, but results in difficulty in shipping and expense in storing.

It would be preferable to ship capsule concentrates separately from the curable epoxy resin in order to reduce shipping and storage costs, if the capsules concentrates remained stable during shipping and storage.

SUMMARY OF THE INVENTION

The present invention relates to latent Lewis acid catalysts for cationically polymerizable resin systems comprising microcapsules of a Lewis acid-polyhydric alcohol complex encapsulated within shell walls of a polymeric material made by an interfacial polymerization of a cycloaliphatic epoxide and a polyhydric alcohol. Additional aspects of the invention include a process for the preparation of the microcapsules and latent Lewis acid concentrates comprised of the microcapsules dispersed in a liquid medium.

The catalysts are suitable for incorporation in cationically curable resins to form one-part, curable systems which have excellent long-term stability and which can be activated in various ways, including by means of mechanical shear, by heat, and by solvent action. The speed and manner of cure can be controlled by the design of the system.

In addition, the capsule concentrates of the present invention exhibit excellent storage stability for long periods of time at room temperature, even when they are not incorporated in a one-part epoxy formulation. These storage-stable capsule concentrates can be shipped and/or stored and can later be added to a curable epoxy resin composition.

DETAILED DESCRIPTION

The microencapsulation process involves the formation of a shell wall utilizing the interfacial polycondensation products of a cycloaliphatic epoxide and a polyhydric alcohol on the surface of a droplet of catalyst in a storage-stable microencapsulation medium. More specifically, the process comprises (a) dispersing and maintaining discrete droplets of a Lewis acid-polyhydric alcohol complex in a liquid medium selected from esters of an aromatic carboxylic acid and an alkyl, aralkyl, aryl, or alkenyl alcohol, the ester containing up to about 40 carbon atoms, and (b) adding to said liquid medium a composition comprising a cycloaliphatic polyepoxide having an equivalent weight of from about 70 to 220 and a functionality of from about 2 to 3.

Interfacial polycondensation occurs at the droplet surfaces to form a slurry of rupturable microcapsules having shell walls of an interfacial reaction product of the polyhydric alcohol and the cycloaliphatic polyepoxide and liquid fills comprising the Lewis acid-polyhydric alcohol complex.

A stabilizer in the form of a scavenger for any catalyst remaining unencapsulated is normally then added or can be added later, e.g. before the capsule concentration is mixed with the curable resin.

The concentrates normally (and preferably) contain from about 1 to 50 parts (by weight) of A, the microcapsules, and 50 to 99 parts of B, the liquid medium, and sum of A and B being 100 parts. A more preferred class are those concentrates which contain from about 10 to 40 parts of the microcapsules and 60 to 90 parts of the liquid medium (the sum of the two being 100 parts).

The microcapsules themselves can, if desired, be separated from the liquid medium and, as previously noted, constitute an additional aspect of the invention. They can be mixed into a different liquid medium prior to use or, if desired, they can be mixed directly into a resin system to be catalyzed or into a component thereof. They can be described as rupturable, impermeable microcapsules ranging in size from about 0.1 to 400 micrometers having (1) shell walls of an interfacial reaction product of a polyhydric alcohol and a cycloaliphatic polyepoxide having an equivalent weight of from about 70 to 220 and a functionality of from about 2 to 3, and (2) liquid fills comprising a Lewis acid-polyhydric alcohol complex. The microcapsules are preferably reaction products of (a) 5-65 parts of Lewis acid,
(b) 5-40 parts of cycloaliphatic polyepoxide, and
(c) 25-85 parts of polyhydric alcohol, the sum of (a), (b) and (c) being 100 parts. The catalyst concentrates containing such capsules are also preferred.

Catalysts suitable for use in the microcapsules of the present invention are well known to the art and include Lewis acids and Lewis acid-derived Bronsted acids, for example $BF_3$, $SnCl_4$, $SbCl_5$, $SbF_5$, $PF_5$, $HBF_4$, $HPF_6$ and $HSbF_6$. These compounds are all referred to herein, for convenience, as Lewis acids. They are complexed with the polyhydric alcohol in order to form a liquid catalyst material which can be readily handled and effectively utilized in the microencapsulation process (the term complex, when used herein, includes any chemical reaction products which may be present). This liquid is insoluble in the medium under the conditions of encapsulation (i.e. will form droplets when dispersed therein).

Polyhydric alcohols that are suitable for use in the present invention include ethylene glycol, diethylene glycol, glycerol, propylene glycol, dipropylene glycol, and triethylene glycol.

The preferred polyhydric alcohol, glycerol, is hydroscopic and, as used, normally contains a minor amount of water, e.g. 0.1-5 percent, although it can contain up to 50 percent of water. The amounts of the polyhydric alcohol as given herein include this water. An excess of the polyhydric alcohol is ordinarily used (over that required to complex with the Lewis acid), and some of the free hydroxyl groups at the surface of the droplets are believed to react with the shell wall components during encapsulation and thereby participate in the formation of the shell walls. When released from the capsules dispersed in a cationically-curable resin, the polyhydric alcohol will mix with the resin and participate in its polymerization.

The liquid medium in which the encapsulation takes place must be chosen so that its characteristics relate suitably to those of the other materials present during encapsulation as well as those of the resin into which the capsules are to be dispersed. Thus the relative viscosities, solubilities, and surface tension properties of the encapsulation medium and the fill material are important factors in forming an adequate suspension of the fill material in the encapsulation medium with droplets of the desired size. The size of the droplet of fill material will determine the ultimate size of the microcapsule. It appears, furthermore, that the partition coefficient of the shell wall components between the encapsulation medium and the fill material are important to the formation of functionally impermeable shell walls, i.e. which effectively isolate the liquid fill under conditions of storage. Finally, the encapsulation medium must be compatible with the cationically polymerizable resin to be catalyzed since the microcapsules are generally introduced into it as a concentrate of capsules in the encapsulating medium.

Encapsulation media are preferably selected from the phthalate, isophthalate, and trimellitate esters of alkyl, aralkyl, aryl, and alkenyl alcohols having from 1 to 20 carbon atoms. Examples of these esters are dimethyl phthalate, diethyl phthalate, dibutyl phthalate, dioctyl phthalate, di-isodecyl phthalate, di-allyl isophthalate, and tri-(2-ethylhexyl)trimellitate. The preferred medium is tri-(2-ethylhexyl)trimellitate.

Exemplary of the cycloaliphatic polyepoxides which are suitable as shell wall components are difunctional compounds such as vinylcyclohexenedioxide, 3,4-epoxycyclohexylmethyl-3,4-epoxycyclohexanecarboxalate, and bis(3,4-epoxy 6-methylcyclohexylmethyl)adipate. These are available from Union Carbide Corp. under the trade designations "ERL 4206", "ERL 4221" and "ERL 4289", respectively. The preferred shell wall-forming ingredients are glycerol and "ERL 4221".

By the proper choice of constituents (particularly the encapsulation medium) and stirring conditions, several size ranges of droplets of the polyhydric alcohol catalyst complex can be obtained (varying from about 0.1 micrometer to 400 micrometers), with faster stirring providing smaller droplets and slower stirring providing larger droplets. The size of the droplets of catalyst in the encapsulation medium is also affected by the temperature of the system. The lower the temperature, the smaller are the droplets for a given shear system. Thus, droplet sizes of 1-10 micrometers can be obtained with high speed stirring and cooling to 0° to 10° C. Addition of shell wall-forming materials then results in capsules approximating the size of the droplets. The preferred capsule size ranges from about 0.5 to about 100 micrometers; a more preferred capsule size is from about 1 to about 20 micrometers; the most preferred capsule size is from about 1 to about 10 micrometers.

The capsule concentrate (the capsules in the encapsulation medium) is ready for use as soon as the encapsulation process is completed. Ordinarily and preferably no medium is removed. If a reactive medium has been used, it reacts to become part of the final resin product, and it must be considered in the material balance of the constituents to assure that substantially complete reaction of the reactive species is ultimately achieved. If a nonreactive medium has been used, it serves as a plasticizer in the final resin product. The concentrate generally contains from about 1 to 20 percent by weight of the Lewis acid catalyst.

Various types of conventional stirring apparatus can be used. Home food blenders as well as laboratory stirrers and blenders can be used depending upon the size of droplets required. The speed required to form droplets of a given size is a function of the type of stirrer blade used, the configuration of the container and the amount of material to be dispersed.

During the encapsulation process a small proportion of the catalyst complex ordinarily becomes entrained in the encapsulation medium, thereby escaping encapsulation. Removal of this free catalyst is necessary in order to prevent premature curing of the cationically polymerizable resin system to which it is ultimately added. This can be accomplished by adding a Lewis base which is strong enough to complex the acid catalyst and prevent curing of the cationically polymerizable resin, but which is not a strong enough base to effect the polymerization of the resin itself. Lewis bases having a $pK_b$ of about 6-11 have been found to be satisfactory. These scavenger materials can be added to either the capsule concentrate or to the curable resin upon preparing the one-part system. The amount of scavenger needed is generally between about 0.1 and 35 mole percent (based upon the number of moles of catalyst present). Preferably about 6-12 mole percent of the scavenger is used.

Suitable scavengers include the following: dimethyl formamide, dibutyl formamide, 2,6-lutidine, 2,5-diacetylimidazole, 3-benzolypyridine, acridine, 1,1'-carbonyldiimidazole, methyl nicotinate, 2,7-dimethylquinoline, 1,2,4-trimethylpiperazine, 2,5-dimethylpyrazine, 4-pyridine carboxaldehyde, 3-acetylpyridine, quinoline, 2,4,6-trimethylpyridine, methyl isonicotinate, acetonitrile and dimethylsulfoxide. The preferred scavengers are 2,6-lutidine, acridine, methyl isonicotinate, and 1,1'-carbonyldiimidazole.

Substantially complete capsule rupture or dissolution can be achieved by any of several different mechanisms, e.g., by mechanical shear, by heat, or by solvents. The size of the microcapsules in any one-part curable resin system of the invention determines to a large degree of the appropriate type of method for rupturing the microcapsules.

The cationically polymerizable monomers (this term includes prepolymers, resins, etc.) which can be used in the one-part curable systems are exemplified by liquid acetals, aziridines, epoxides, ethylenically unsaturated hydrocarbons, N-vinyl compounds, vinyl ethers and, if desired, mixtures thereof. These will often be referred to herein for convenience as monomers. The monomers preferred for use in this invention are the epoxides, although the other cationically polymerizable monomers are useful and can be used as additives to the epoxy systems. The most suitable epoxy materials are resins having an epoxide equivalent number of 2.0 or greater. Included are bisphenol A diglycidyl ether, bisphenol F diglycidyl ether, aliphatic epoxides, cycloaliphatic epoxides, epoxy novolak and heterocyclic epoxy resins.

The one-part curable systems which incorporate the concentrates of the present invention appropriately contain I. 1–40 parts (by weight) of the capsule concentrate (including the encapsulation medium); II. 60–99 parts of the cationically curable monomers and III. a Lewis base scavenger having a $pK_b$ of about 6–11, the sum of I and II being 100 parts, and there being about 0.1 to 35 mole percent of III, based on the moles of the Lewis acid in the capsules. The specific amounts of these constituents are carefully balanced in any particular one-part system. Thus, the effective amount of catalyst present is reduced by the amount of the free scavenger present.

Various additives, including fillers, plasticizers and reactive diluents can be used in the one-part, curable systems to modify their properties and render them more suitable for particular end uses. Any material which does not dissolve the shell wall may ordinarily be added to these one-part systems. Suitable fillers may be powdered, granular, particulate, or fibrous, and include clay, talc, glass beads or bubbles, glass fibers, mineral powders, mineral particles, metal powders, titanium dioxide, silicon carbide, carbon black, mica, silica, sand, mineral fibers and the like. They may be added in amounts ranging from 1 to 95 percent.

The reactive diluents, referred to previously, are added, for example, to obtain faster cure times and to modify the properties of the cured polymer. The reactivity of the diluent also often governs the gel time and affects the latency of the sample. They may include hydroxyl-terminated tackifiers, long-chain polyols, polyesters, polyurethanes, anhydrides, polyisocyanates (including aromatic, cycloaliphatic and aliphatic polyisocyanates), phenylglycidyl ether, diglycidyl ether, the glycidyl ester of a tertiary $C_9$–$C_{11}$ carboxylic acid (available from the Shell Chemical Corp. under the trade designation "Cardura E Ester"), the butyl ester of epoxidized linseed oil (available from Swift Chemicals under the trade designation "Epoxol 8-2B") beta or gamma-butyrolactone, styrene, d-limonene, dipentene, dioxane, trioxane, and the like. The reactive diluents may be added in amounts of 1–50 percent based upon the total weight of the system. The amount of isocyanate resin (e.g. "Mondur MRS") has an effect on the gel time and shelf life of these formulations (the smaller the amount of "Mondur MRS" present, the shorter is the shelf life and the faster the gel time). In order to promote reactivity of the isocyanate resin into the polymer in the heat-curable, one-part epoxy compositions, urethane catalysts may be added to the system. Examples of urethane catalysts are stannous octoate, diacetoxydibutyltin, dibutyltindilaurate, lead naphthanate and phenylmercury oleate. Since there is no unencapsulated hydroxyl functionality present in such systems, they exhibit good shelf stability even with urethane catalysts present. The urethane catalyst can be present to the extent of about 0.05 to 0.5 percent based on the total weight of the system. When isocyanate resin is used as a reactive diluent, strict attention must be paid to the amount of hydroxyl functionality present in the other ingredients (such as epoxy resin) in the system since the hydroxyl groups could react with free isocyanate groups to form urethane linkages and cause unwanted viscosity increases in the system.

The latent, one-part epoxy formulations made utilizing catalysts of the present invention are useful in many applications where epoxy resins are currently being employed. In particular, they are useful as adhesives and coatings. They cure rapidly either upon activation at room temperature by shear or upon the application of heat, no solvents are emitted, and because the polymerization catalyst is already distibuted throughout the resin, there is no need for costly and complicated two-part meter mix equipment. Finally, these one-part epoxy systems have excellent shelf stability at room temperature.

An important feature of the present invention is that the capsule concentrates themselves exhibit excellent storage stability for long periods of time at room temperature. Unlike capsule concentrates containing isocyanates, the capsule concentrates of the present invention can be shipped and stored alone, rather than as part of a latent, one-part epoxy formulation.

The following non-limiting examples illustrate the practice of this invention. Unless otherwise indicated, all parts, proportions and percentages (in the examples and throughout the specification and claims) are by weight, and all viscosities are measured using a Brookfield viscometer. The gel times are measured by placing a drop of a one-part system on a glass cover slip which is being heated to the appropriate temperature by a Kofler Heizbank Gradient Temperature Heating Bar. The time required to gel completely is recorded. Also, unless otherwise indicated, the gel times are determined on freshly prepared samples.

Certain products utilized frequently in the examples are referred to therein for convenience by short descriptive phrases identified as follows.

Polyisocyanate I. A polymethylenepolyphenylisocyanate having a molecular weight of about 380 and an average isocyanate equivalent weight of 133 (thus containing about 2.6 isocyanate groups per molecule), available from the Mobay Chemical Corporation under the trade designation "Mondur MRS".

Cycloaliphatic polyepoxide I. 3,4-epoxycyclohexylmethyl-3,4-epoxycyclohexanecarboxylate having the formula

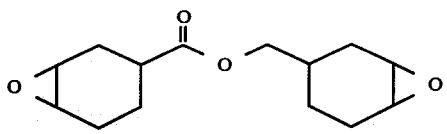

available from the Union Carbide Corporation under the trade designation "ERL-4221".

Epoxy resin I. A bisphenol A-based epoxy resin having an epoxy equivalent weight (EEW) of 185–192, available from the Shell Corporation Company under the trade designation "Epon 828".

Epoxy resin II. A bisphenol A-based epoxy resin having an epoxy equivalent weight of 182–190, available from the Dow Chemical Company under the trade designation "DER-331".

Reactive diluent I. The glycidyl ester of a tertiary $C_9$–$C_{11}$ carboxylic acid, available from the Shell Chemical Company under the trade designation "Cardura E Ester".

Reactive diluent II. A blend of terpene hydrocarbons, predominantly dipentene, obtained by fractionization of wood turpentine available from SCM Organic Chemicals under the trade designation "Glidco Dipentene Extra".

Reactive diluent III. A triol based upon polypropylene glycol and having a molecular weight of 740, obtained from the BASF Wyandotte Corporation under the trade designation "Pluracol TP 740".

Reactive diluent IV. A hydroxyl terminated polyester resin, available from the Mobay Chemical Corporation under the trade designation "Multron R-16".

PREPARATION OF THE LATENT CATALYSTS

I. Lewis acid/polyhydric alcohol complexes

Lewis acid/polyhydric alcohol complexes were prepared by adding the Lewis acid slowly to the alcohol while cooling in an ice bath in order to keep the temperature of the exothermic reaction mixtures from exceeding 70° C.

Example 1

One part of antimony pentafluoride was added to one part of diethylene glycol over a two hour period to form a batch containing 3700 grams. Constant stirring was maintained while the mixture was cooled in an ice bath. The resulting liquid product was light golden yellow in color and had a viscosity of about 10,000 centipoises at 22° C.

Example 2

One part of boron trifluoride gas was bubbled slowly into four parts of glycerol over a period of 90 minutes to form a batch containing 3400 grams. The mixture was stirred constantly and cooled in an ice bath during this period. The liquid product had a viscosity of about 4000 centipoises at 22° C. and was light yellow in color.

PREPARATION OF CAPSULE CONCENTRATES

Example 3

Seventy parts of tri-(2-ethylhexyl)trimellitate were cooled to 3° C. and stirred at 600 RPM using a Premier Dispersator fitted with a 2½ inch diameter Waring Blendor blade. Twenty parts of the 20% boron trifluoride-glycerol complex prepared as in Example 2 were added. Agitation was increased to 3000 RPM. When the temperature reached 4° C., ten parts of a 50/50 solution of cycloaliphatic epoxide I and tri-(2-ethylhexyl)trimellitate were added over a 1 to 1½ minute period. The resulting mixture was stirred at 1500 RPM for 10 minutes to give capsule concentrate containing 4% boron trifluoride catalyst.

Example 4

Sixty-four parts of tri-(2-ethylhexyl)trimellitate were cooled to 3° C. and stirred with the apparatus of Example 3. Twenty-six parts of the 50% antimony pentafluoride-diethylene glycol complex prepared as in Example 1 and ten parts of the 50/50 mixture of cycloaliphatic polyepoxide I and tri-(2-ethylhexyl)trimellitate were added according to the procedure of Example 3. The resulting mixture yielded capsule concentrate containing 13% antimony pentafluoride catalyst.

ONE-PART SYSTEMS CONTAINING THE LATENT CATALYSTS

Example 5

A one-part resin system was prepared containing the following ingredients:
- 56.00 parts epoxy resin I
- 12.88 parts reactive diluent II
- 15.00 parts polyisocyanate I
- 16.00 parts 13% SbF$_5$ capsule concentrate (from Example 4)
- 0.12 parts 2,6-lutidine This formulation gelled in about 2 minutes at 150° C.

Example 6

A one-part resin formulation was prepared according to the procedure of Example 5 with the exception that the following capsule concentrate was utilized in place of the 13% SbF$_5$ capsule concentrate:
- 67 parts dioctyl phthalate
- 22 parts 20% boron trifluoride-glycerol complex (prepared as in Example 2)
- 11 parts of a 50/50 mixture of cycloaliphatic polyepoxide I and dioctyl phthalate The above 4.4% boron trifluoride capsule concentrate was prepared as in Example 3 except that dioctyl phthalate was used in place of tri-(2-ethylhexyl)trimellitate.

The one-part resin system gelled in about 6 seconds at 150° C. and in about 1 minute at 110° C.

Example 7

A one-part resin formulation was prepared exactly as in Example 5 except that the following capsule concentrate was used in place of the 13% SbF$_5$ capsule concentrate:
- 69 parts di-isodecyl phthalate
- 21 parts 20% boron trifluoride-glycerol complex (prepared as in Example 2)

10 parts of a 50/50 mixture of cycloaliphatic polyepoxide I and di-isodecylphthalate The above 4.2% boron trifluoride capsule concentrate was prepared as in Example 3 except di-isodecylphthalate was utilized in place of tri-(2-ethylhexyl)trimellitate.

The one-part resin system gelled in about 5 seconds at 150° C. and in about 11 seconds at 110° C.

Example 8

A one-part resin system was prepared according to the following formulation:

56.00 parts epoxy resin I
12.87 parts reactive diluent II
15.00 parts polyisocyanate I
16.00 parts 4% boron trifluoride capsule concentrate
0.13 parts N,N-dimethylformamide The 4% boron trifluoride capsule concentrate was prepared as in Example 3 with the exception that the following formulation was used:

66.0 parts tri-(2-ethylhexyl)trimellitate
20.0 parts 20% boron trifluoride-glycerol complex
(prepared as in Example 2)
14.0 parts of a 50/50 mixture of cycloaliphatic polyepoxide I and tri-(2-ethylhexyl)trimellitate The above one-part resin system gelled in about 5 seconds at 140° C. and in about 8 seconds at 110° C.

Example 9

Table I sets forth formulations for various capsule concentrates. These concentrates were prepared according to the procedure of Example 3.

TABLE I

| Lot capsule concentrate | TET[a] | parts by weight 20% BF$_3$-glycerol[b] | ERL-4221/TET(50/50)[c] |
|---|---|---|---|
| A | 63.3 | 20.0 | 16.7 |
| B | 66.7 | 20.0 | 13.3 |
| C | 70.0 | 20.0 | 10.0 |

[a]TET represents tri-(2-ethylhexyl)trimellitate.
[b]20% BF$_3$-glycerol complex was prepared according to the procedure of EXAMPLE 2.
[c]ERL-4221/TET (50/50) represents a 50/50 mixture of cycloaliphatic polyepoxide I and tri-(2-ethylhexyl)trimellitate.

Table II describes several one-part epoxy systems prepared from various capsule concentrates.

TABLE II

| Lot | Formulation | Gel time at 100° C. (sec) | Viscosity (cps) Initial | 1 day | 2 day | 3 day | 14 days |
|---|---|---|---|---|---|---|---|
| 1 | 15 parts Capsule concentrate A 85 parts Epoxy resin II | 10 | 8550 | 9800 | 1060 | 9150 | 30,000 |
| 2 | 15 parts Capsule concentrate B 85 parts Epoxy resin II | 5 | 8800 | 9500 | gelled | — | — |
| 3 | 15 parts Capsule concentrate C 85 parts Epoxy resin II | 4 | 8300 | 9150 | gelled | — | — |
| 4 | 15 parts Capsule concentrate A 65 parts Epoxy resin II 20 parts Reactive diluent I | 170 | 850 | 850 | 850 | 850 | 1,850 |
| 5 | 15 parts Capsule concentrate B 65 parts Epoxy resin II 20 parts Reactive diluent I | 175 | 850 | 850 | 1500 | 2000 | >100,000 |
| 6 | 15 parts Capsule concentrate C 65 parts Epoxy resin II 20 parts Reactive diluent I | 155 | 750 | 850 | 1450 | 1950 | 100,000 |
| 7 | 15 parts Capsule concentrate B 50 parts Epoxy resin II 25 parts Reactive diluent IV 10 parts Cycloaliphatic polyepoxide I | 9 | 4900 | 7450 | gelled | — | — |
| 8 | 15 parts Capsule concentrate B 50 parts Epoxy resin II 25 parts Reactive diluent IV 10 parts Reactive diluent I | 75 | 2900 | 3900 | 4250 | — | 50,000 |
| 9 | 15 parts Capsule concentrate B 50 parts Epoxy resin II 25 parts Reactive diluent III 10 parts Cycloaliphatic polyepoxide I | 6 | 1100 | 1750 | gelled | — | — |
| 10 | 15 parts Capsule concentrate B 50 parts Epoxy resin II 25 parts Reactive diluent III 10 parts Reactive diluent I | 32 | 600 | 1200 | 3150 | — | gelled |

Example 10

Tables III and IV compare the stability between those microencapsulated Lewis acid catalyst concentrates containing isocyanates as the encapsulating medium and those utilizing tri-(2-ethylhexyl)trimellitate.

TABLE III

| | Viscosity, cps (storage at room temperature, 23–25° C.) | | | | | |
|---|---|---|---|---|---|---|
| Encapsulation Medium | Initial | 1 Week | 2 Weeks | 4 Weeks | 2 Months | 10 Months |
| "Mondur MRS" | 2,300,000 | >5,000,000 | >5,000,000 | >5,000,000 still usable | >5,000,000 not usable | — |
| Tri-(2-ethylhexyl)- | 3,965,000 | 1,647,500 | — | 850,000 | 1,370,000 | 860,000* |

TABLE III-continued

| | Viscosity, cps (storage at room temperature, 23-25° C.) | | | | | |
|---|---|---|---|---|---|---|
| Encapsulation Medium | Initial | 1 Week | 2 Weeks | 4 Weeks | 2 Months | 10 Months |
| trimellitate | | | | | | |

*Slight separation was observed, resulting in reduced apparent viscosity.

TABLE IV

| Encapsulation Medium | Stability Results (Storage at 110° F.) |
|---|---|
| "Mondur MRS" | Not usable after 1-2 days due to extremely high viscosity |
| Tri-(2-ethylhexyl)trimellitate | Approximately 10% separation of TET after 6 days. After 48 days, viscosity equaled 37,000 cps (taken at room temperature) with the TET essentially 100% separated out. The TET was easily redispersed into the catalyst system. |

What is claimed is:

1. A latent catalyst concentrate which comprises a slurry of
   A. rupturable, impermeable microcapsules ranging in size from about 0.1 to 400 micrometers having
   (1) shell walls of an interfacial reaction product of a polyhydric alcohol and a cycloaliphatic polyepoxide having an equivalent weight of from about 70 to 220 and a functionality of from about 2 to 3, and
   (2) liquid fills comprising a Lewis acid-polyhydric alcohol complex in
   B. a liquid medium selected from esters of an aromatic carboxylic acid and an alkyl, aralkyl, aryl, or alkenyl alcohol, the ester containing up to about 40 carbon atoms.

2. A latent catalyst concentrate according to claim 1 in which the microcapsules are reaction products of
   (a) 5-65 parts of Lewis acid,
   (b) 5-40 parts of cycloaliphatic polyepoxide and
   (c) 25-85 parts of polyhydric alcohol,
   the sum of (a), (b), and (c) in the microcapsules being 100 parts.

3. A latent catalyst concentrate according to claim 1 which additionally contains in the liquid medium thereof from about 0.1 to 35 mole percent, based upon the amount of Lewis acid present in the microcapsule fills, of a Lewis base scavenger which has a $pK_b$ of from about 6 to 11.

4. A latent catalyst concentrate according to claim 1 in which the Lewis acid makes up from about 1 to 20 percent of the weight of the concentrate.

5. A latent catalyst concentrate according to claim 1 which contains from about 1 to 50 parts of A., the microcapsules, and 50 to 99 parts of B., the liquid medium, the sum of A. and B. being 100 parts.

6. A latent catalyst concentrate according to claim 5 which contains from about 10 to 40 parts of A., the microcapsules, and 60 to 90 parts of B., the liquid medium, the sum of A. and B. being 100 parts.

7. A latent catalyst concentrate according to claim 1 in which the microcapsules range in size from about 0.5 to 100 micrometers.

8. A latent catalyst concentrate according to claim 1 in which the microcapsules range in size from about 1 to 20 micrometers.

9. A latent catalyst concentrate according to claim 1 in which the microcapsules range in size from about 1 to 10 micrometers.

10. A latent catalyst concentrate according to claim 1 in which the functionality of the cycloaliphatic polyepoxide is 2.

11. Rupturable, impermeable microcapsules ranging in size from about 0.1 to 400 micrometers having
    (1) shell walls of an interfacial reaction product of a polyhydric alcohol and a cycloaliphatic polyepoxide having an equivalent weight from about 70 to 220 and a functionality of from about 2 to 3, and
    (2) liquid fills comprising a Lewis acid-polyhydric alcohol complex.

12. Microcapsules according to claim 11 wherein said microcapsules are the reaction products of
    (a) 5-65 parts of Lewis acid,
    (b) 5-40 parts of cycloaliphatic polyepoxide,
    (c) 25-85 parts of polyhydric alcohol, the sum of (a), (b), and (c) in the microcapsules being 100 parts.

13. Microcapsules according to claim 11 which range in size from about 0.5 to 100 micrometers.

14. Microcapsules according to claim 11 which range in size from about 1 to 20 micrometers.

15. Microcapsules according to claim 11 which range in size from about 1 to 10 micrometers.

16. Microcapsules according to claim 11 in which the functionality of the cycloaliphatic polyepoxide is 2.

17. A method for the preparation of a latent catalyst concentrate which comprises
    (a) dispersing and maintaining discrete droplets of a complex of a Lewis acid with polyhydric alcohol in a liquid medium selected from esters of an aromatic carboxylic acid and an alkyl, aralkyl, aryl, or alkenyl alcohol, the ester containing up to about 40 carbon atoms, and
    (b) adding to said liquid medium a composition comprising a cycloaliphatic polyepoxide having an equivalent weight of from about 70 to 220 and a functionality of from about 2 to 3,
    whereby interfacial polycondensation occurs at the droplet surface to form a slurry of rupturable, impermeable microcapsules having shell walls of an interfacial reaction product of polyhydric alcohol and the cycloaliphatic polyepoxide and liquid fills comprising the Lewis acid-polyhydric alcohol complex.

18. A method according to claim 17 wherein the liquid medium is an ester.

19. A method according to claim 18 wherein the liquid medium is a phthalate ester.

20. A method according to claim 18 wherein the liquid medium is a trimellitate ester.

21. A method according to claim 17 wherein the Lewis acid is $BF_3$.

* * * * *